United States Patent
Fleming et al.

(10) Patent No.: US 9,665,522 B2
(45) Date of Patent: *May 30, 2017

(54) PROTOCOL NEUTRAL FABRIC

(71) Applicant: Intel Corporation, Santa Clara, CA (US)

(72) Inventors: Bruce L. Fleming, Morgan Hill, CA (US); Achmed R. Zahir, Menlo Park, CA (US); Arvind Mandhani, San Francisco, CA (US); Satish B. Acharya, Bangalore (IN)

(73) Assignee: Intel Corporation, Santa Clara, CA (US)

(*) Notice: Subject to any disclaimer, the term of this patent is extended or adjusted under 35 U.S.C. 154(b) by 173 days.

This patent is subject to a terminal disclaimer.

(21) Appl. No.: 14/594,293

(22) Filed: Jan. 12, 2015

(65) Prior Publication Data

US 2015/0134873 A1    May 14, 2015

Related U.S. Application Data

(63) Continuation of application No. 13/249,414, filed on Sep. 30, 2011, now Pat. No. 8,943,257.

(51) Int. Cl.
*G06F 13/36* (2006.01)
*G06F 13/40* (2006.01)
(Continued)

(52) U.S. Cl.
CPC .......... *G06F 13/4027* (2013.01); *G06F 13/20* (2013.01); *G06F 13/385* (2013.01);
(Continued)

(58) Field of Classification Search
CPC ............. G06F 13/4027; G06F 13/4022; G06F 13/4045; G06F 13/385; G06F 13/36; G06F 13/4282; G06F 2213/0026
(Continued)

(56) References Cited

U.S. PATENT DOCUMENTS 5,621,900 A * 4/1997 Lane ..................... G06F 13/368
                                                                710/120
5,734,850 A    3/1998 Kenny
(Continued)

FOREIGN PATENT DOCUMENTS

CN    102098212    6/2011
CN    103530254    1/2014
(Continued)

OTHER PUBLICATIONS

China Patent Office, Office Action mailed Sep. 29, 2015 in Chinese Patent Application No. 201280047773.4.
(Continued)

*Primary Examiner* — Faisal M Zaman
(74) *Attorney, Agent, or Firm* — Trop, Pruner & Hu, P.C.

(57) ABSTRACT

An embodiment integrates non-PCI compliant devices with PCI compliant operating systems. A fabric system mimics the behavior of PCI. When non-PCI compliant devices do not know how to respond to PCI enumeration, embodiments provide a PCI enumeration reply and thus emulate a reply that would typically come from a PCI compliant device during emulation. Embodiments allow system designers to incorporate non-standard fabric structures with the benefit of still using robust and mature PCI infrastructure found in modern PCI compliant operating systems. More generally, embodiments allow an operating system compliant with a first standard (but not a second standard) to discover and communicate with a device that is non-compliant with the first standard (but possibly is compliant with the second standard). Other embodiments are described herein.

15 Claims, 4 Drawing Sheets

(51) Int. Cl.
*G06F 13/20* (2006.01)
*G06F 13/42* (2006.01)
*G06F 13/38* (2006.01)

(52) U.S. Cl.
CPC ............ *G06F 13/404* (2013.01); *G06F 13/42* (2013.01); *G06F 13/4221* (2013.01)

(58) Field of Classification Search
USPC .................................................. 710/306, 315
See application file for complete search history.

(56) References Cited

U.S. PATENT DOCUMENTS

| | | | |
|---|---|---|---|
| 5,751,975 | A | 5/1998 | Gillespie |
| 5,878,239 | A | 3/1999 | Furuta |
| 5,999,198 | A | 12/1999 | Horan |
| 6,067,589 | A | 5/2000 | Mamata |
| 6,076,128 | A | 6/2000 | Kamijo |
| 6,119,192 | A | 9/2000 | Kao |
| 6,199,134 | B1 | 3/2001 | Deschepper |
| 6,230,223 | B1 | 5/2001 | Olarig |
| 6,272,582 | B1 | 8/2001 | Streitenberger |
| 6,430,637 | B1 | 8/2002 | Larson |
| 6,748,478 | B1 | 6/2004 | Burke |
| 6,963,947 | B2 | 11/2005 | Piatetsky |
| 6,996,658 | B2 | 2/2006 | Brocco |
| 7,058,738 | B2 | 6/2006 | Stufflebeam |
| 7,231,486 | B2 | 6/2007 | Ajanovic |
| 7,251,704 | B2 * | 7/2007 | Solomon ............... H04L 49/252 710/30 |
| 7,571,273 | B2 | 8/2009 | Boyd |
| 7,783,819 | B2 | 8/2010 | Mandhani |
| 7,814,259 | B2 | 10/2010 | Stewart |
| 7,934,033 | B2 | 4/2011 | Malwankar |
| 8,402,197 | B2 | 3/2013 | Brocco |
| 8,595,405 | B2 | 11/2013 | Matthews |
| 8,713,230 | B2 | 4/2014 | Feng |
| 8,943,257 | B2 * | 1/2015 | Fleming .................. G06F 13/20 710/104 |
| 2002/0178317 | A1 | 11/2002 | Schmisseur |
| 2003/0018464 | A1 * | 1/2003 | Khanna ............... G06F 13/4027 703/21 |
| 2003/0037199 | A1 * | 2/2003 | Solomon ............. G06F 13/4022 710/314 |
| 2003/0079075 | A1 | 4/2003 | Asseline |
| 2003/0097503 | A1 | 5/2003 | Huckins |
| 2003/0101302 | A1 * | 5/2003 | Brocco ................. G06F 13/404 710/300 |
| 2003/0115380 | A1 * | 6/2003 | Ajanovic ............. G06F 13/124 710/1 |
| 2004/0039986 | A1 | 2/2004 | Solomon |
| 2004/0049618 | A1 | 3/2004 | Schmisseur |
| 2004/0083324 | A1 * | 4/2004 | Rabinovitz ......... G06F 13/4022 710/315 |
| 2004/0109195 | A1 | 6/2004 | Davis |
| 2005/0027908 | A1 | 2/2005 | Ong |
| 2005/0086415 | A1 | 4/2005 | Huang |
| 2005/0198596 | A1 | 9/2005 | Oshins |
| 2006/0059249 | A1 | 3/2006 | Wei |
| 2006/0106911 | A1 | 5/2006 | Chapple |
| 2007/0088857 | A1 | 4/2007 | Schluessler |
| 2008/0201515 | A1 * | 8/2008 | Birgin ................... G06F 13/409 710/313 |
| 2008/0263184 | A1 | 10/2008 | De Haan |
| 2009/0106471 | A1 | 4/2009 | Kaushik |
| 2010/0017547 | A1 * | 1/2010 | Das ..................... G06F 13/4045 710/35 |
| 2010/0287325 | A1 | 11/2010 | Mandhani |
| 2011/0145469 | A1 | 6/2011 | Choi |
| 2011/0231707 | A1 | 9/2011 | Davenport |

FOREIGN PATENT DOCUMENTS

| | | |
|---|---|---|
| CN | 103842980 | 6/2014 |
| GB | 2460331 | 12/2009 |
| WO | 9724677 | 7/1997 |

OTHER PUBLICATIONS

Chang, Chin-Yao, et al., "Introduction to and Regression Test for OCP SystemC Channel Models," Sep. 4, 2007, 8 pages.
Tyson, Jeff, et al., "How PCI Works," http://compter.howstuffworks.com/pci1.htm/printable, Sep. 13, 2011, 4 pages.
International Searching Authority, "Transmittal of the International Search Report and Written Opinion of the International Searching Authority," mailed Mar. 15, 2013, in International Application No. PCT/US2012/056880.
European Patent Office, "Communication-extended European search report," in Application No. 12836281.1-1954/2761483 mailed on Apr. 15, 2015 (7 pages).
State Intellectual Property Office of the People's Republic of China, Second Office Action mailed May 16, 2016 in Chinese Patent Application No. 201280047773.4.
State Intellectual Property Office of the People's Republic of China, Third Office Action mailed Sep. 18, 2016, in Chinese Patent Application No. 201280047773.4.
European Patent Office, Examination Report mailed Aug. 5, 2016 in European Patent Application No. 12836281.1.

* cited by examiner

| PCI-2-OCP Bridge Registers | | Used By Mechanism |
|---|---|---|
| IOCFG Control Register | IOCFGCTL | 1, 2, 3, 4 |
| Upstream Bridge Data Register | UPBRIDGEDATA | 1 and 2 |
| Upstream Bridge Command Register | UPBRIDGECMD | 1 and 2 |
| SMI Command Register | SMICMD | 2, 3, 4 |
| SMI Address Register | SMIADDR | 2, 3, 4 |
| SMI Data Register | SMIDATA | 2, 3, 4 |
| SMI Status Register | SMISTS | 2, 3, 4 |

FIG. 4

PROTOCOL NEUTRAL FABRIC

This application is a continuation of U.S. patent application Ser. No. 13/249,414, filed Sep. 30, 2011, the content of which is hereby incorporated by reference.

BACKGROUND

Peripheral Component Interconnect (PCI) concerns a specification defining a local fabric system that allows PCI compliant devices (e.g., expansion cards) to communicate with a host processor. As used herein, a fabric concerns bus and/or interconnect systems for coupling components on a platform (e.g., coupling a peripheral device to a processor). During system initialization, PCI enumeration occurs, which is a process of assigning resources to PCI devices on a PCI host bridge. This process includes: (1) assigning PCI fabric numbers and PCI interrupts, (2) allocating PCI input/output (I/O) resources, PCI memory resources, and PCI prefetchable memory resources, and (3) setting miscellaneous PCI direct memory access (DMA) values. PCI enumeration may be performed during the boot process. This enumeration relates to a plug and play (PnP) specification, which allows a host to configure itself automatically to work with devices (e.g., PCI devices, cameras, controllers, monitors). A user can "plug" in a peripheral device and "play" it without manually configuring the system. A PnP platform may require both a PnP compliant BIOS and a PnP compliant device.

Certain architectures (e.g., advanced extensible interface (AXI), open core protocol (OCP)) are modular and allow for rapid proliferation by quickly adding or deleting intellectual property (IP) blocks from an existing design. This is due in part to an interconnect fabric that can be automatically generated for a given configuration, and a large ecosystem of IP blocks that implement the same standard interface to be coupled to these fabrics. These IP blocks, however, cannot be used with PCI compliant hosts as the blocks lack features required for PCI compatibility. For example, these IPs operate at fixed addresses (precluding PnP), there is no mechanism for discovery and enumeration, PCI-style ordering is not implemented, and PCI-style power management features are missing.

Thus, many platforms (e.g., Smartphones, handheld mobile devices, personal digital assistants, tablets, laptops, netbooks, and the like) that want to operate with these non-PCI complaint IPs cannot also work with shrink-wrap PCI compliant operating systems (e.g., Linux, Microsoft Windows). As a result, designers must write fabric drivers and OSs that are specific to each device. This workaround is problematic because, for example, having to produce specific drivers tailored to specific devices inhibits development and scalability of solutions.

BRIEF DESCRIPTION OF THE DRAWINGS

Features and advantages of embodiments of the present invention will become apparent from the appended claims, the following detailed description of one or more example embodiments, and the corresponding figures, in which:

FIG. 4 includes a register configuration in various embodiments of the invention.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

Figure 1:
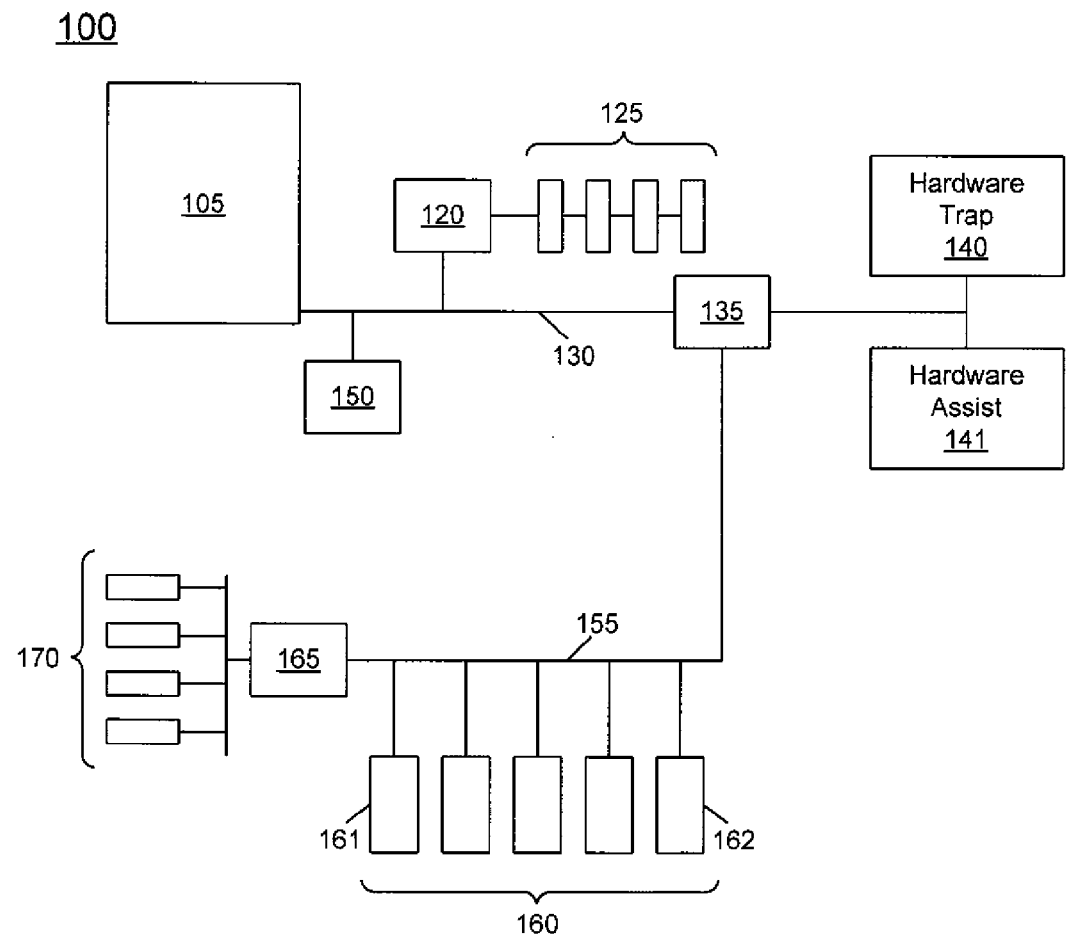
FIG. 1 includes a block diagram of an embodiment of the invention.

FIG. 1 includes a block diagram of an embodiment of the invention. A high-performance system on a chip (SOC) fabric 130 couples processor 105 (e.g., central processing unit with integrated caches) to memory 125 (e.g., system memory such as RAM). This coupling may occur via memory controller 120 in some embodiments. PCI compatible devices can be directly connected to the SOC fabric. For example, fabric 130 connects directly to graphics device 150.

I/O fabric 155 couples to SoC fabric 130 via bridge 135. Thus, I/O fabric 155 couples processor 105 to devices 160. Devices 160 may include, for example, audio subsystems, Universal Serial Bus (USB), Serial Advanced Technology Attachment (SATA), UART, SDIO, SPI, I2S, I2C, MIPI HSI controllers, and/or various SoC accelerators. These devices may be non-PCI compliant. For ease of reference, device 161 is considered as PCI PnP compliant and device 162 is non-PCI PnP compliant. I/O fabric 155 may couple to still further devices 170 via bridge 165.

Bridge 135 may be part of a chipset and may operate to integrate data from other fabrics onto the main system fabric. Bridge 135 may couple to or include hardware trap module 140 and hardware assist module 141. The trap and assist modules may include hardware logic (e.g., microcontroller), firmware, and/or software. Modules 140, 141 are discussed in greater detail with regard to FIG. 2.

FIG. 1 is merely a representative block diagram. Interfaces to other fabrics, such as a USB or Firewire fabric, may be included in embodiments. PCI fabric 155 may be substituted with a non-PCI compliant fabric in various embodiments. Also, an embodiment may include multiple PCI fabrics.

PCI fabric 155 may communicate with a PnP BIOS and a shrink-wrap PCI OS (e.g., Windows, Linux) operating on processor 105. Thus, system 100 may include PnP features for PCI compliant devices located within devices 160 and/or 170 (which may be mixed with non-PCI compliant devices in devices 160 and/or 170). PnP allows system 100 to automatically recognize and configure devices. A PnP BIOS may read the Extended System Configuration Data (ESCD) for configuration information on existing PnP devices. PnP handlers in the OS may complete the configuration process started by the BIOS for each PnP device. PnP automates several tasks such as, for example, setting of interrupt requests (IRQ) hardware interrupt to allow devices to communicate with processor 105. Bridge 135 manages hardware interrupts to avoid conflicts among devices 160. PnP also sets direct memory access (DMA) so any of devices 160 are configured to access system memory 125 without consulting the processor 105 first. Also, PnP sets memory addresses so devices 160 are assigned a section of system memory 125 for exclusive use. PnP further sets I/O configurations to define ports used by devices 160 for receiving and sending information.

Figure 2:
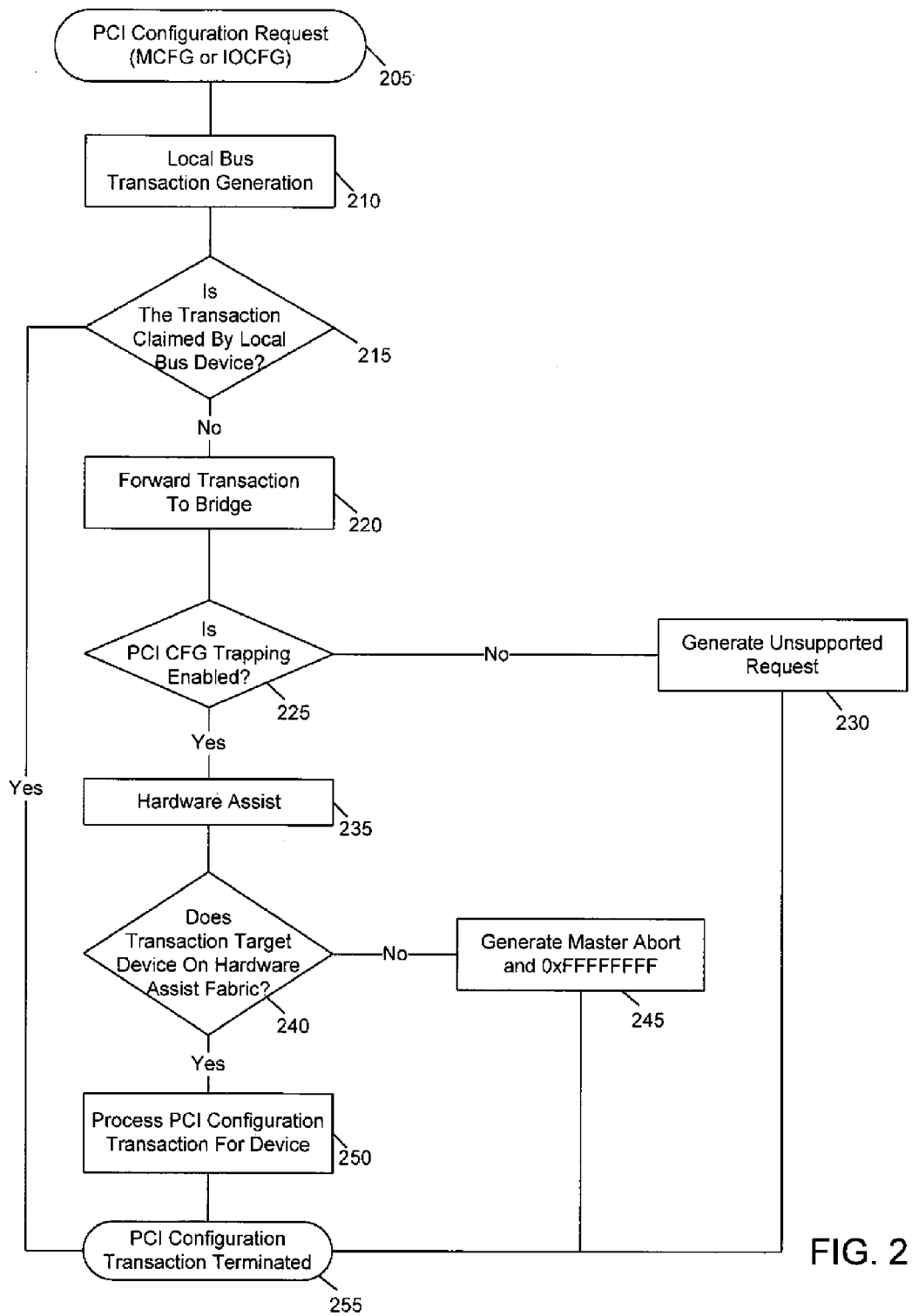
FIG. 2 includes a process in an embodiment of the invention.

FIG. 2 includes a process in an embodiment of the invention. Process 200 begins in block 205 by the initiation of enumeration. In one embodiment, with enumeration system BIOS initiates the PnP BIOS. PnP BIOS scans PCI fabric 155 for hardware by sending out a signal to devices connected to the fabric by asking for the ID of devices 160. A PnP device, such as device 161, may respond by identifying itself with its device ID being sent, via fabric 155, to the BIOS. The PnP BIOS checks the ESCD to see if the configuration data for PnP device 161 is already present. If not, the PnP BIOS assigns, for example, IRQ, DMA, memory address, and I/O settings to PnP device 161 and saves the data in the ESCD. When the OS boots it checks the ESCD and PCI fabric 155. The OS detects that device 161 is a new device and finds and loads the necessary drivers Block 205 may include use of a Simple Firmware Interface (SFI) for firmware to export static tables to the OS. SFI tables are data structures in memory which may share a common table header format. SFI may provide access to a standard ACPI XSDT (Extended System Description Table), which may be used by SFI to prevent namespace collision between SFI and ACPI. SFI may access standard ACPI tables such as a PCI Memory Configuration Table (MCFG). The OS may find the system table by searching within boundaries between physical addresses. Block 205 may also attend to setting or checking configuration registers such as the IOCFG register.

In block 210 a local fabric transaction generation occurs. In block 215, if the transaction is claimed by a local fabric device (e.g., fabric 155) then the process continues to block 255 where the PCI configuration transaction ends and enumeration continues on if need be.

However, if in block 215 the configuration transaction (e.g., cycle) is not claimed an embodiment of the invention forwards the transaction to bridge 135 (block 220). If hardware trap 140 is not enabled the process advances to block 230 where an Unsupported Request (UR) response is generated. If trapping is enabled the hardware trap and hardware assist modules 140, 141 come into play.

Generally regarding modules 140, 141, an embodiment extends the existing PCI structure in a SoC to include devices which reside on non-PnP fabrics (e.g., OCP compliant devices like device 162). Module 140 includes/ couples a hardware trap module that includes hardware to trap and forward PCI configuration transactions (i.e., cycles) (block 235). Module 141 includes a hardware assist module that includes logic or firmware to handle the trap and provide a behavior model to provide a consistent PCI configuration space across disparate fabric structures (e.g., both devices 161 and 162) (block 240).

More specifically and as stated above, existing PCI configuration support in the SoC generates PCI configuration cycles (see block 205), some of which are claimed by devices which are on a fabric which supports PCI (see "yes" branch emanating from block 215). However, cycles which are not claimed in the PCI fabric (see "no" branch emanating from block 215) are forwarded to bridge 135 (block 220). Conventionally, whenever a non-PnP enabled bridge receives a PCI configuration or I/O transaction the bridge will generate a UR response and the transaction will terminate. However, modules 140, 141 add logic to (directly or via coupling) bridge 135. Module 140 traps the transaction and generates a notification to the HW Assist component of module 141 (block 235). Hardware assist module 141 receives information from bridge 135 (which includes or couples to module 14) about the transaction (e.g., R/W, Fabric, Device, Function, register). Hardware assist 141 determines, based upon the information regarding the transaction, what type of response should be generated (block 240). If the transaction does not target device on the hardware assist fabric (e.g., device 161), then hardware assist 141 generates a master abort (block 245). Otherwise, in block 250 hardware assist use features of bridge 135 (see blocks 250, 255) to properly terminate the transaction.

In another embodiment bridge 135 can generate an interrupt to the primary host processor (e.g., processor 105), which allows the code running on the host to emulate the desired behavior. A system management interrupt (SMI) can be used to invoke OS-independent platform specific code in a way that is transparent to the OS.

There are various embodiments for modules 140, 141, four of which are addressed below. These embodiments achieve emulation of legacy I/O and Configuration cycles and are as follows: (1) microcontroller (uController)-assist, Non-SMI# Mechanism, (2) uController-assist, uController-generated-SMI# Mechanism, (3) uController-assist, Bridge-generated-SMI# Mechanism, and (4) Non-uController-assist, Bridge-generated-SMI# Mechanism. I/O cycles and configuration cycles can each be independently operating in different mechanisms.

Figure 3:
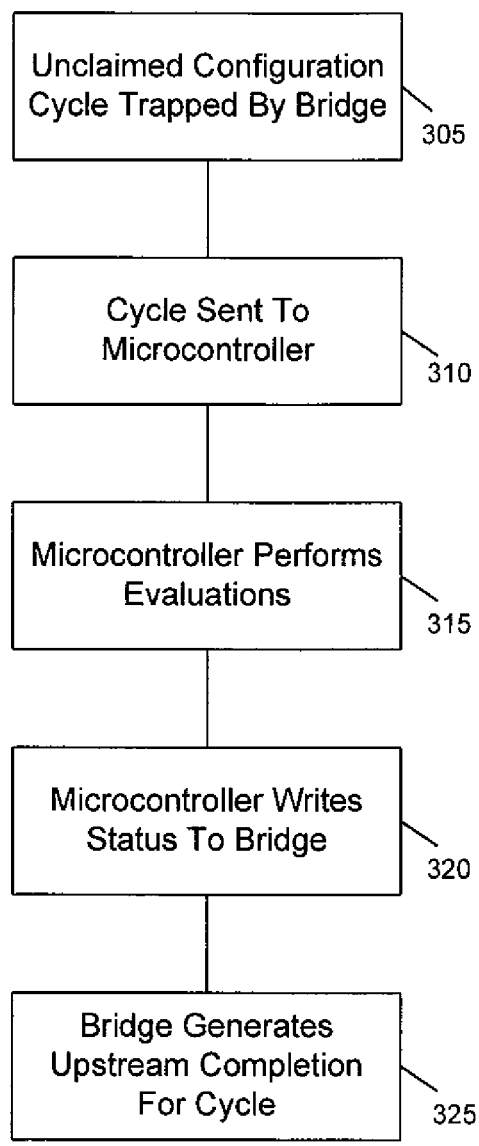
FIG. 3 includes a process in an embodiment of the invention.

Regarding the first mechanism (uController-assist, Non-SMI# Mechanism), the mechanism requires a uController in the OCP fabric (e.g., device 161). This puts the burden of PCI emulation on the uController. A high-level flow chart regarding this embodiment is included in FIG. 3. In block 305 I/O cycles initiated by CPU, which are unclaimed by other agents, are forwarded as I/O or PCI Configuration (Config) cycles. These are trapped by PCI-2-OCP Bridge (module 140) (block 305) and sent to uController (block 310) using, for example, Inter Processor Communication (IPC) messages on Thread2. Configuration bits in the IO_IPC_EN and CFG_IPC_EN registers enable this functionality. The registers default to disabled status.

In block 315 the uController performs its PCI or I/O cycle emulations by running code. For example, the uController provides the OS with device IDs, IRQ, DMA, memory address, and I/O settings for the device (e.g., device 161).

In block 320, uController writes to successful or unsuccessful completion status, along with any data to be returned with read completion, to a specific address location inside bridge 135 register space on Thread2. In block 325 bridge 135 generates an upstream completion communication for the I/O or Configuration cycle.

Regarding the second mechanism (uController-assist, uController-generated-SMI# Mechanism), the mechanism also requires a uController in OCP fabric. The embodiment is similar to that of FIG. 3; however, this in this embodiment the uController generates an SMI#. This provides flexibility and enables firmware (e.g., Intel instruction-set architecture for its microprocessors) to share emulation responsibility with uController and handle situations that uController is unable to deal with. The embodiment includes blocks 305, 310, 315 but afterwards the embodiment the uController generates a SMI# as a Virtual Legacy Wire (VLW). Bridge 135 forwards VLW_Complete back to the uController. The uController then writes to a specific address location inside Bridge 135 register space on Thread2 with a successful or unsuccessful completion status (block 320). uController is the single SMI# controller in the platform.

Regarding the third mechanism (uController-assist, Bridge-generated-SMI# Mechanism), this mechanism also requires a uController in OCP fabric and is similar to the second mechanism but bridge 135 generates an SMI#. The embodiment may implement blocks 305, 310, 315, 320. If the uController returns an unsuccessful completion, bridge 135 generates a SMI# to processor 105 and sets SMI_STS bit. Configuration bits IO_SMI_EN and CFG_SMI_EN registers (when IO_IPC_EN & CFG_IPC_EN are enabled) enable SMI# generation functionality inside bridge 135 and default to disabled. With no legacy sideband signals, the VLW mechanism is used to deliver SMI# to processor 105. Hardware needs to ensure ordering of VLW and completion for I/O or Configuration transaction. Specifically, processor 105 may receive VLW before the I/O operation completes. Bridge 135 then sends a message (indicating this is VLW for SMI#) on Sideband Channel to generate a VLW SMI# message to processor 105. Bridge 135 clears EOS (End of SMI) bit when SMI# is launched. Bridge 135 is the single SMI# controller in the platform. When SMI# VLW is delivered to CPU, a confirmation message is sent back to bridge 135 with VLW_Complete message on a Sideband Channel. This helps ensure SMI# has been delivered to CPU and there is only a single outstanding VLW message. Bridge 135 has a SMI# Status register that saves source of SMI#. The mechanism implements block 325 and a SMM handler clears SMI_STS bit and sets EOS bit before exiting.

Regarding the fourth mechanism (Non-uController-assist, Bridge-generated-SMI# Mechanism), the mechanism does not require a uController in the OCP fabric and relies on firmware (e.g., Intel instruction-set architecture for its microprocessors) for emulation. The embodiment allows unconditional vectoring of any I/O or Configuration back to the processor via SMI#. Thus, (1) if uController IPC mechanism changes/evolves over time, this can be accommodated by adapting the SMI# handler, and (2) the embodiment provides a mechanism to emulate I/O and Configuration cycles for PCI IPs on secondary OCP segments that do not have an uController. An embodiment implements a flow as follows. I/O and Configuration cycles initiated by CPU, that are unclaimed by other agents, are trapped by PCI-2-OCP bridge 135. Bridge 135 generates a SMI# to processor 105 via a VLW message on a Sideband Channel. Configuration bits IO_SMI_EN and CFG_SMI_EN (when IO_IPC_EN & CFG_IPC_EN disabled) enable SMI# generation functionality inside Bridge and default to disabled. Bridge 135 generates a completion for the I/O or Configuration cycle. The mechanism implements block 325.

In addition to acting as a subtractive agent for system 100 (see block 215 where Configuration transaction is not claimed), bridge 135 can be configured to positively decode (i.e., claim) memory-mapped address ranges or I/O address ranges accessed using, for example, IN/OUT instructions. This allows bridge 135 to be used in systems in which an existing subsystem already acts as the subtractive agent.

FIG. 4 includes a table of registers defined in bridge 135 and relating to the four mechanisms described above.

PCI, as used herein, includes variations of PCI such as PCI-Express. Also, PnP includes PnP occurring during the boot process (e.g., enumeration). In some embodiments, PnP is limited to the boot process and is not applicable for post boot processes (e.g., hot plugging and consequent remapping). PnP and enumeration, as used herein, are not necessarily limited to the PCI standard.

An embodiment integrates non-PCI compliant devices with PCI compliant operating systems. Embodiments implement solutions at a hardware level. A fabric system mimics the behavior of real PCI. Interception of PCI CFG cycles using modules 140, 141 reduce the gatecount (e.g., processing) required to implement PCI decode. When non-PCI compliant devices do not know how to respond to PCI enumeration, embodiments provide a PCI enumeration reply and thus emulate a reply that would typically come from a PCI compliant device through firmware running on a microcontroller. Embodiments allow system designers to incorporate non-standard fabric structures with the benefit of still using robust and mature PCI infrastructure found in modem PCI compliant operating systems. Embodiments allow a PCI compliant OS to discover a non-PCI compliant device, all transparently to the OS. More generally, embodiments allow an operating system compliant with a first standard (but not a second standard) to discover and communicate with a device that is non-compliant with the first standard (but possibly is compliant with the second standard). In an embodiment, instead of customizing OSs to work with different devices one can use an off-the-shelf shrink-wrap PCI compliant OS to work with numerous devices (which are not PCI compliant). This may be facilitated by adjusting the firmware in the SoC that includes the fabric.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a non-Peripheral Component Interconnect (PCI) compliant device;
   a non-plug-n-play compliant hardware bridge coupling a PCI compliant fabric to a non-PCI compliant fabric; and
   a hardware assist module;
   wherein the bridge is configured to trap an unclaimed PCI configuration transaction after the PCI configuration transaction traverses the PCI compliant fabric;
   wherein the hardware assist module, including a microcontroller on the non-PCI compliant fabric, is configured to: (a) receive information from the bridge, and (b) based on the information, provide a PCI enumeration reply to a PCI compliant host operating system (OS) on behalf of the device;
   wherein the PCI enumeration reply includes information that corresponds to the device and includes at least one of a device ID, IRQ, DMA, memory address, SMI, and I/O setting;
   wherein the device is on the non-PCI compliant fabric, the PCI configuration transaction is configured for the PCI-compliant fabric, and the non-PCI compliant fabric is configured to operatively couple the OS to the device.

2. The apparatus of claim 1, wherein the OS is plug-n-play compliant and the device is not plug-n-play compliant.

3. The apparatus of claim 2, wherein the device includes a non-PCI compliant controller and the OS is not specifically configured to operate with the device.

4. The apparatus of claim 1, wherein the PCI configuration transaction includes a PCI configuration cycle.

5. The apparatus of claim 4, wherein the bridge is configured to mimic PCI protocol to the OS.

6. The apparatus of claim 4, wherein the PCI configuration cycle is produced by the OS during enumeration.

7. The apparatus of claim 1, wherein the non-PCI compliant fabric is configured to reserve memory for the device.

8. The apparatus of claim 1, wherein the device is Open Core Protocol (OCP) compliant and the bridge is a PCI-2-OCP bridge.

9. The apparatus of claim 1 including the OS.

10. A system comprising:
    a processor;
    a memory coupled to the processor;
    a non-standard compliant device that does not comply with a first standard and is on a second fabric;
    a non-plug-n-play compliant hardware bridge, which couples a first fabric, which is configured for the first standard, to the second fabric, which is configured for a second standard; and
    a hardware assist module configured to trap an unclaimed main system fabric configuration transaction, which is configured for the first standard, after the configuration transaction traverses the first fabric;
    wherein the second fabric is configured to: (a) operatively couple a standard compliant host operating system (OS), which complies with the first standard, to the device, and (b) couple the device to the processor;
    wherein the hardware assist module, which includes a microcontroller on the second fabric, is configured to receive information from the bridge and, based on the information, provide a standard compliant enumeration reply to the OS on behalf of the device;
    wherein the enumeration reply includes information that corresponds to the device and includes at least one of a device ID, IRQ, DMA, memory address, SMI, and I/O setting.

11. The system of claim 10, wherein the first standard includes a Peripheral Component Interconnect (PCI) standard.

12. The system of claim 10, wherein the first standard includes a plug-n-play standard.

13. The system of claim 10, wherein the configuration transaction includes a configuration cycle.

14. The system of claim 13, wherein the configuration cycle is produced by the OS during enumeration.

15. The system of claim 10 comprising the OS.

* * * * *